US006552670B2

(12) United States Patent
Sundaravel et al.

(10) Patent No.: US 6,552,670 B2
(45) Date of Patent: Apr. 22, 2003

(54) LOCATION ENCODER

(75) Inventors: Vale Sundaravel, Framingham, MA (US); Benjamin J. Paul, Winchester, MA (US)

(73) Assignee: Switchboard Incorporated, Westborough, MA (US)

( * ) Notice: Subject to any disclaimer, the term of this patent is extended or adjusted under 35 U.S.C. 154(b) by 8 days.

(21) Appl. No.: 09/863,962

(22) Filed: May 23, 2001

(65) Prior Publication Data

US 2001/0051852 A1 Dec. 13, 2001

Related U.S. Application Data

(60) Provisional application No. 60/206,738, filed on May 24, 2000, and provisional application No. 60/213,013, filed on Jun. 21, 2000.

(51) Int. Cl.[7] .......................... H03M 1/22; G01C 21/30; G01C 21/32
(52) U.S. Cl. ............................ 341/5; 701/212
(58) Field of Search ................ 340/988; 342/457; 434/2; 701/211, 212, 208, 213; 707/100; 341/5

(56) References Cited

U.S. PATENT DOCUMENTS

| | | | | |
|---|---|---|---|---|
| 3,764,719 A | * | 10/1973 | Dell | ............... 434/2 |
| 3,864,681 A | * | 2/1975 | Olive | ............... 342/457 |
| 5,404,135 A | * | 4/1995 | Janex | ............... 340/988 |
| 5,727,057 A | | 3/1998 | Emery et al. | |
| 5,848,131 A | | 12/1998 | Shaffer | |
| 5,953,722 A | * | 9/1999 | Lampert et al. | ............ 707/100 |
| 5,991,739 A | | 11/1999 | Cupps et al. | .............. 705/26 |
| 6,047,236 A | * | 4/2000 | Hancock et al. | ............ 701/208 |
| 6,199,014 B1 | * | 3/2001 | Walker et al. | ............. 701/211 |

FOREIGN PATENT DOCUMENTS

| | | |
|---|---|---|
| GB | 1485799 | 9/1977 |
| WO | WO 00/23862 | 4/2000 |

* cited by examiner

Primary Examiner—Patrick Wamsley
(74) Attorney, Agent, or Firm—Kevin A. Oliver; Foley Hoag LLP

(57) ABSTRACT

A method and apparatus to convert geographic information to a binary representation, or bingeo. The geographic information can be converted to a bingeo for a selected reference or coordinate system, and with respect to a reference within the selected coordinate system. The coordinate system location to bingeo conversion can be hierarchical or iterative and can include segmenting the coordinate system or segments thereof. The iterative algorithm can include identifying a segment including the specified location, and segmenting the identified segment. During an iteration, segments can be assigned a binary code that can be incorporated into the bingeo. Successive segmentation iterations can be performed to provide increased precision. In one embodiment, a precision of 0.16 inches squared can be attained. Two bingeos can be compared, in the simplest form, using a bitwise logical XOR.

93 Claims, 6 Drawing Sheets

FIG. 5

| 49CCACC | 49CCAC8 | |
|---|---|---|
| X 49CCAC4 | 49CCAC0 | 49CCA9 |
| 49CCA6 | | 49CCA3 |

50 →
40

LOCATION ENCODER

CLAIM OF PRIORITY

This application claims priority to U.S. S. No. 60/206,738, entitled "Venue Encryption Apparatus and Method", filed on May 24, 2000, naming Vale Sundaravel and Benjamin J. Paul as inventors, the contents of which are herein incorporated by reference in their entirety, and this application also claims priority to U.S. S. No. 60/213,013, entitled "Discrete Location Encoder", filed on Jun. 21, 2000, naming Vale Sundaravel and Benjamin J. Paul as inventors, the contents of which are also herein incorporated by reference in their entirety.

CROSS-REFERENCE TO RELATED APPLICATIONS

This patent application is co-pending with a related patent application entitled "Geographical Comparison Apparatus and Method", having the same inventors as this patent application, and filed concurrently herewith, the contents of which are incorporated herein by reference.

BACKGROUND (1) Field

The methods and systems relate generally to encoding data, and more particularly to encoding geographic data.

(2) Description of the Prior Art

In 1999, it is estimated that there were approximately 171 million internet users. It is estimated that four years later, the number of internet users will more than double, expanding electronic traffic throughout the world with increasing concentration. Electronic traffic travels as data packets "hop" from an originating device, through intermediate hubs, to a destination device. Often, the intermediate hubs are preprogrammed according to traffic assumptions and network architecture constraints, thereby causing a majority of data packets to travel unnecessarily long paths between the originating and destination devices. This inefficient hopping scheme places a tremendous burden on telecommunications system infrastructures such as the internet, often resulting in data packets that are misdirected completely, or "lost". As the number of internet users expands, this problem will increase dramatically.

To manage the internet traffic burden and decrease network latency and packet loss, internet infrastructure providers designed "efficiency" algorithms to compensate for inherently non-directional computer networks. Many of these algorithms are extraordinarily expensive and time consuming. For example, one well-known algorithm includes data headers appended to individual data packets to facilitate the counting and recording of the number of intermediate hops that a packet takes on its journey, and incorporating routers and switches in the network architecture to aim packets along routes that minimize the number of hops. In practice, such methods may actually contribute to network latency as each routing expands the transmission time by examining the packet and altering the packet header.

The significance of the network latency problem can be evidenced by certain internet infrastructure providers that post current latency and packet loss statistics for their networks. Specifying direction to electronic data in computer networks may dramatically improve the speed and efficiency of internet communications while decreasing the burden on infrastructure providers. Such data direction can be provided by better analyzing the originating and destination devices to determine a more optimal path.

It is believed that the internet expansion has also sparked a general interest in all things electronic, and it is therefore not unreasonable to predict that this interest will continue to grow as the internet expands. This assumption, coupled with the prediction that wristwatches, phones, computers, automobiles, and nearly every mobile electronic device, will be location-aware and communications enabled, indicates an independent, emerging urgency for efficient electronic trafficking. Present examples of such mobile electronic devices include internet enabled cellular phones and personal digital assistants (PDAs) that incorporate Global Positioning System (GPS) receivers.

Further proof of the ever-increasing electronic traffic demands and requirements includes Federal Communications Commission (FCC) regulation E911 that requires location awareness for cellular phones sold in the United States after Oct. 1, 2001.

As mobile devices are enhanced, it is anticipated that mobile devices will proliferate, and more people will use the devices to connect to computer networks such as the internet to locate other people, places, items, businesses, services, etc. in designated areas of interest. It is expected that the availability of such information from mobile devices can drastically increase personal efficiency.

To realize the anticipated increase in personal efficiency, it is necessary that electronic devices utilize efficient searching algorithms that readily identify and parse location-based information; however, since mobile computing devices are by definition portable, such devices are historically small in size and therefore lack the processor speed and storage space of desktop personal computers. Additionally, connections between the mobile devices and the internet utilize "thin pipes" including wireless modems that can typically be slower and more prone to signal-loss interruption than counterpart land-line modems. Since mobile device users are often generally mobile people who desire information quickly, such users may be less tolerant of increased delays due to complex searching algorithms.

There is currently not a sufficiently efficient method or system of location identification that facilitates rapid location comparison.

What is needed is an efficient location encoding method and system that allow efficient data comparison.

SUMMARY

The disclosed methods and systems can encode geographic information into a binary number, otherwise known as a geocode and referred to herein as a "bingeo", that can be compared to other, similarly encoded geographic information using well-known bitwise comparison techniques. In embodiments where the bingeo is binary, the bitwise comparison can provide a geographic comparison without knowledge of underlying geographic information.

The encoding methods and systems can incorporate geographic precision. For example, a bingeo bit can correspond to geographic precision, and generally, the bingeo precision can relate to the geographic precision. In some embodiments, the geographic precision can be specified or selected, and in some embodiments, the precision can be inherently or implicitly stipulated by the geographic information provided for encoding.

Geographic information can include information that can be translated to a coordinate or reference system, using a reference that can be applied to the coordinate system, for example, the reference or coordinate system of latitude and longitude. Geographic information can include, for example, areas codes, street addresses, and zip codes, latitudes and/or longitudes, etc., that can be related to or converted to a reference system using known techniques.

The methods and systems can utilize a reference or coordinate system and iteratively segment the reference system by subdividing individual segments into quadrants. Quadrants can be assigned, for example, a numeric value, wherein the placement of the numeric value within the bingeo relates to the iterative level of quadrant segmentation. The segmentation iteration level can similarly correspond to a geographic precision, as the number of iterations can increase the geographic precision.

In one embodiment, an iterative segmentation scheme can be provided. In a first iteration, the segmentation scheme can be applied to the entire coordinate system, while in subsequent segmentations, the segmentation scheme may only be applied to the subdivision or segment that includes the location of interest. Similarly, in an embodiment, a methodology or other scheme for assigning binary digits, coordinated with the segmentation scheme, can be iteratively performed in an identical manner for the different segmentation levels.

In one embodiment, the encoded binary representations can be used to generate at least one database having binary encoded locations of services, items, etc. A system can process requests from a user desiring services, items, etc., related to a specified geography, wherein the system can receive either the specified geography information, or the binary encoded form thereof, for extremely efficient comparison and identification of similarly located services, items, etc. Because the bingeo can be binary and can facilitate bitwise comparison, processor or microprocessor-based comparison can be extremely efficient.

The methods and systems can identify geographic locations near a quadrant border, wherein for a particular resolution, the methods and systems can perform similar resolution segmentation of an adjacent quadrant to identify similarly located items, services, etc.

In another embodiment, bingeo codes can identify proximity of network devices. By comparing an originating network location with a destination network location, an efficient path between the two networks can be quickly determined.

In an embodiment, the iterative methods and systems can be performed recursively using well-known recursive programming techniques.

Other objects and advantages will become obvious hereinafter in the specification and drawings.

BRIEF DESCRIPTION OF THE DRAWINGS

FIG. 5 presents another iteration of the FIG. 4 illustration at a refined segmentation level;

DESCRIPTION

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

The techniques provided herein present segmentation and indexing methods and systems. In an embodiment, the methods and systems can be iterative, and segment resolution can increase with iteration. In one embodiment, a binary code or number can be assigned to segments in an iteration. In such an embodiment, a binary code or number from a segmentation or iteration level can be incorporated into a composite binary representation, otherwise referred to herein as a "bingeo", wherein the bingeo can be representative of binary codes from multiple iterations or segmentations. In this embodiment, the bingeo can record the binary codes from the iterative segmentations.

For the purposes of the discussion herein, a segment can also be referred to and understood to be a subdivision, either of which are a result of a segmentation process. As will be discussed herein with reference to the illustrated embodiments, for example, quadrants result from segmentation, and hence references to quadrants can be understood to be a reference to a segment or subdivision. Other segmentation schemes can be used, for example, such that the segmentation schemes produce a number of segments or subdivisions that can be overlapping or non-overlapping.

Figure 1:
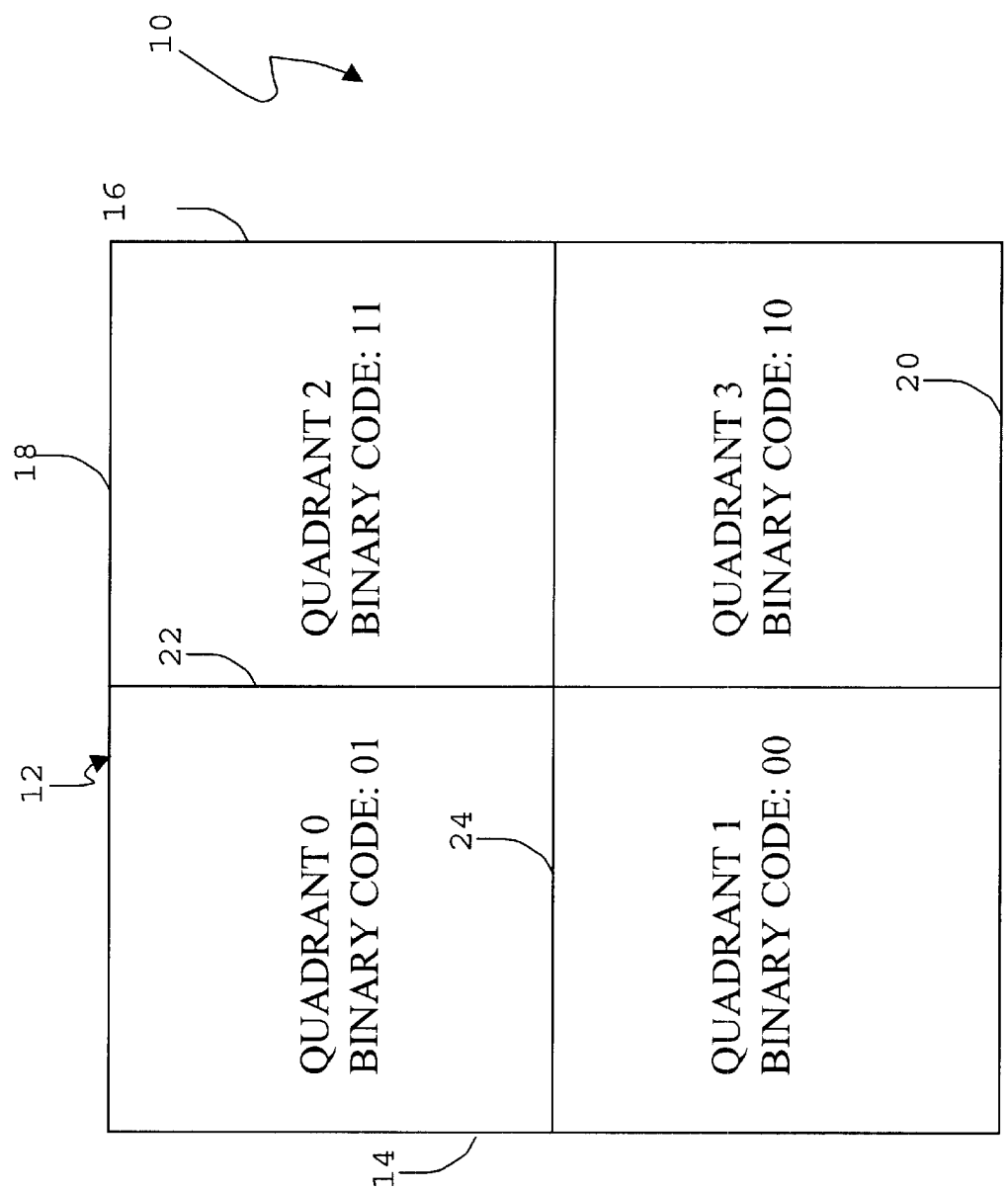
FIG. 1 presents a diagram illustrating a segmentation of a coordinate system.

Referring now to FIG. 1, there is an illustration 10 of a segmentation algorithm that can be applied to a reference or coordinate system. The embodiment discussed herein refers to the reference or coordinate system comprised of latitudes and longitudes, however those with ordinary skill in the art will recognize that the methods and systems can be applied to a reference or coordinate system that can be referred to herein collectively as coordinate systems. Similarly, those with ordinary skill in the art will recognize that the methods and systems herein can be applied to a reference system within a given coordinate system, as such reference system is not fixed and can be arbitrarily determined in some embodiments.

FIG. 1 displays the latitudinal and longitudinal system as the large outer rectangle 12 wherein, for example, the left-most vertical segment 14 can represent −180° longitude, and the rightmost vertical segment 16 can represent 180° longitude, although such reference is provided for illustration and not limitation. As FIG. 1 indicates, according to the illustrated segmentation scheme, the rectangle 12 representing the latitude and longitude reference system can be divided into evenly sized quadrants, thereby indicating that the center vertical segment 22 can represent 0° degrees longitude, while the center horizontal segment 24 can represent 0° degrees latitude. Those with ordinary skill in the art will recognize that although the division of quadrants as shown in FIG. 1 is uniform and square, other divisions can be implemented that can be uniform or non-uniform. The division of the coordinate system into quadrants as shown in FIG. 1 can be understood as the first level of segmentation in this example of a segmentation algorithm. Those skilled in the art will also recognize that the methods and systems can be practiced differently by segmenting the reference or coordinate system into a different number of segments, or by altering the reference points for segmentation.

Referring again to the embodiment of FIG. 1, once the reference or coordinate system is segmented, a unique binary number can be assigned to the segments that are shown in FIG. 1 as quadrants. In the example illustrated by FIG. 1 where a segment is a quadrant, the unique binary numbers assigned to the quadrants can be 00, 01, 10, and 11, respectively, with binary code assignments to segments as shown in FIG. 1. Such assignment of binary numbers is merely for illustration and not limitation, and other binary numbers and/or other numerical representations can be made.

Figure 2:
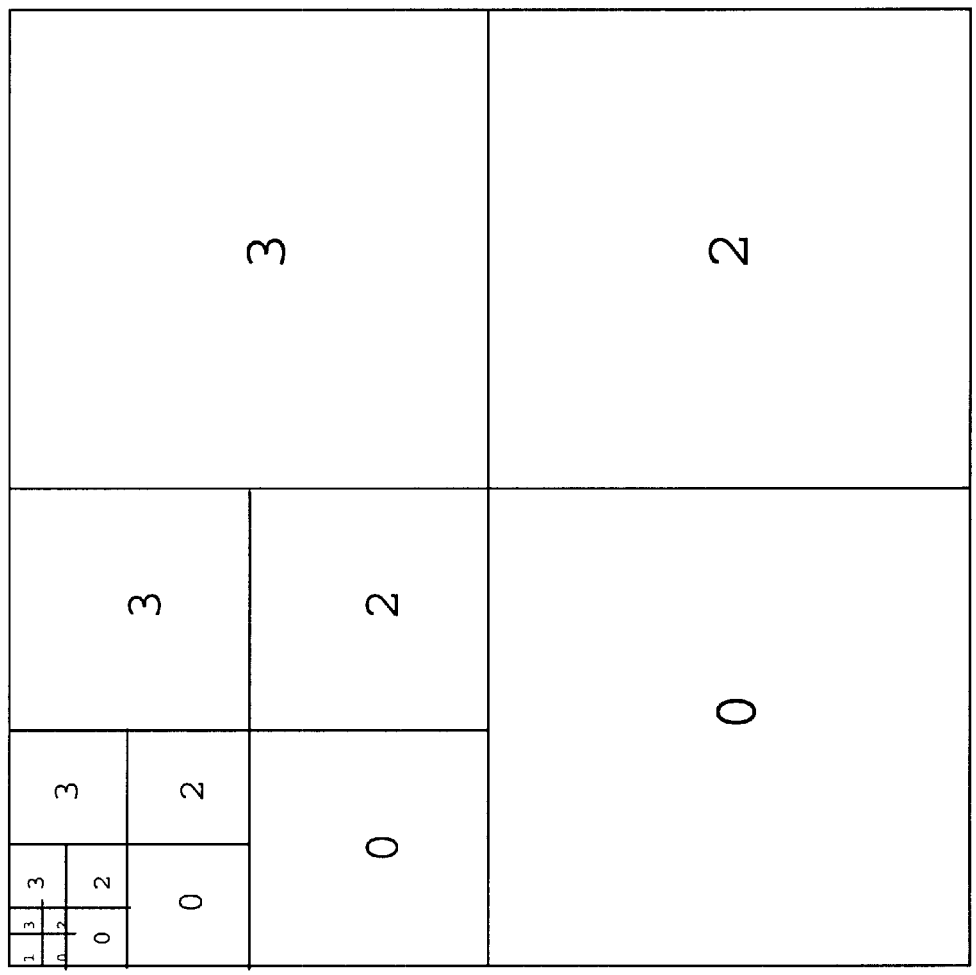
FIG. 2 displays the segmenting algorithm of FIG. 1 as it is applied iteratively five times.

Referring to FIG. 2, there is a graphical representation of the segmentation scheme or algorithm presented in FIG. 1, as the segmentation algorithm is iteratively applied to a single quadrant, shown in FIG. 1 as "quadrant 1". As FIG. 2 indicates, "quadrant 1" from FIG. 1 can be subdivided into four quadrants in FIG. 2, wherein the quadrants can be assigned binary codes or numbers (represented in base 10 notation) in a similar manner as the previous segmentation level. This second iteration of the segmentation algorithm to a single quadrant can be referred to as a second level of iteration, or a second hierarchical level. As FIG. 2 indicates, quadrant one from the second iteration or hierarchical level can again be segmented in quadrants to generate a third iteration or hierarchical level. FIG. 2 thus indicates the segmentation results and binary assignments for four iterative segmentations applied to "quadrant 1" of FIG. 1. FIG. 2 also displays that, for the illustrated system and segmentation scheme, for a new hierarchical or iteration level, the segment size is proportionately smaller (by one-quarter) when compared to the previous level of iteration, thereby providing better resolution or precision. One of ordinary skill will recognize that herein, hierarchical level or layer, segment level or layer, precision level or layer, iteration level or layer, recursion level or layer, can be understood to be equivalent terms. The assignment of quadrant number and associated binary number can be the same in different iteration levels. For example, in the FIG. 1 and FIG. 2 illustration, for the segmentation levels, the lower-left segment is quadrant zero and represented by "00", the upper-left segment is quadrant one represented by "01", the lower-right quadrant is assigned quadrant two represented by "10", and the upper-right quadrant is quadrant three and represented by "11".

Figure 3:
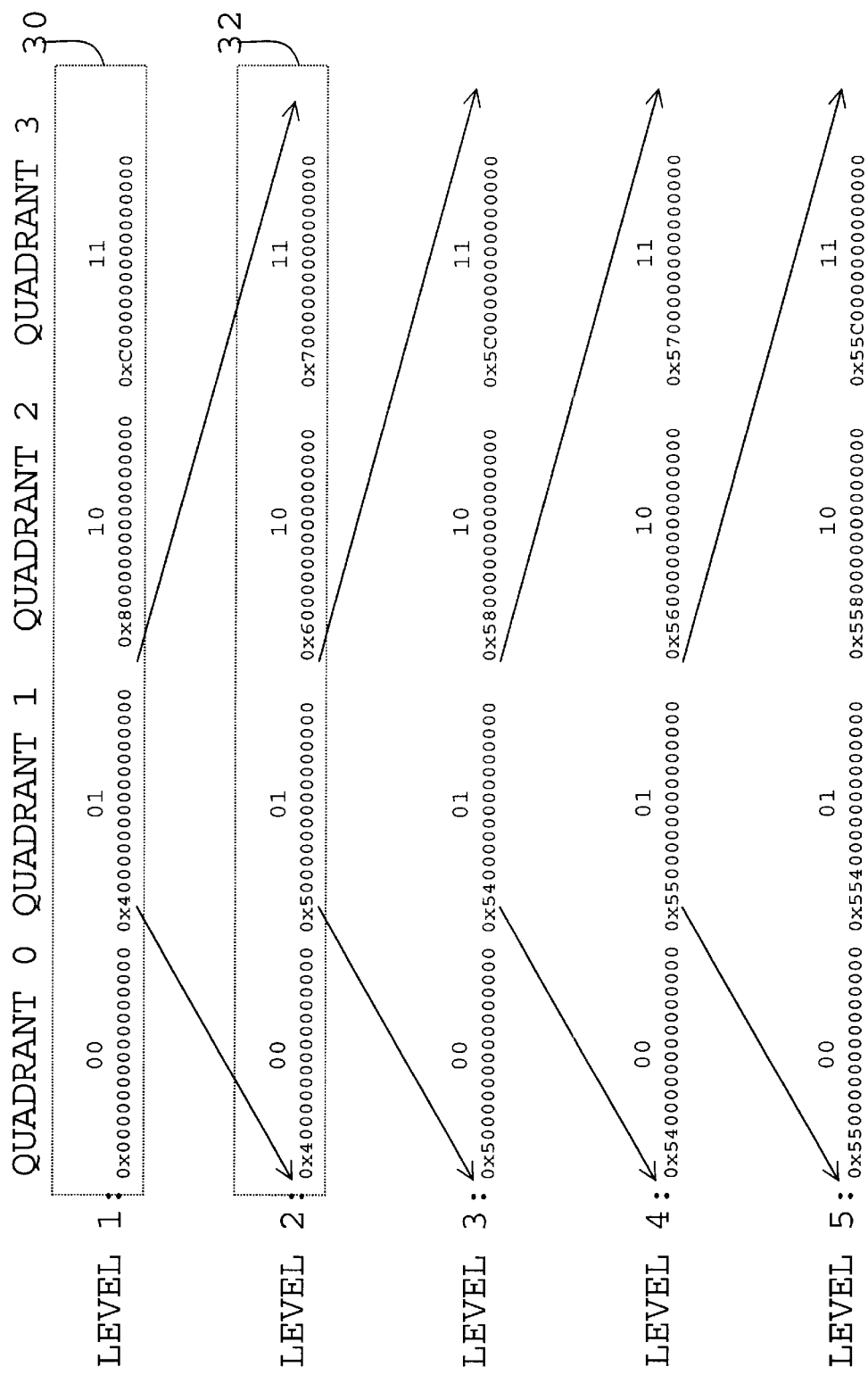
FIG. 3 indicates the binary representations resulting from the five segmentations of FIG. 2.

FIG. 3 presents one construction of a bingeo with respect to the five layers of segmentation for a system having a segmentation algorithm illustrated by FIGS. 1 and 2. In an embodiment presented by FIG. 3, the bingeo length is sixty-four bits, represented by a 16-bit hexadecimal number with the conventional "0x" prefix to indicate hexadecimal notation. In this representative embodiment, illustrated by FIGS. 1–3, where a quadrant can be assigned a unique two-bit binary number, a level of iteration can be assigned a specific bit-pair in the sixty-four bit bingeo, up to thirty-two segmentations or hierarchical iterations can be represented in the sixty-four bit bingeo. Those with ordinary skill in the art will recognize that the bingeo is not restricted to sixty-four bits, and can include fewer or more bits, depending upon the coordinate or reference system, the desired resolution (i.e., the number of hierarchical or iterative segmentations), processing constraints, etc. Additionally, although a system or method such as the system and method illustrated herein can provide the capability to generate bingeos of a certain precision, some bingeos may not be computed to such precision; therefore, in an embodiment, bingeos can be further associated with a bingeo precision indicator. For example, in a representative example as shown herein wherein a bingeo can be sixty-four bits, a bingeo can be associated with another byte, or eight bits, that represents the number of segmentation levels incorporated or represented in the respective bingeo. Other methods of associating the segmentation levels can include masks, etc., and the methods and systems are not limited by a precision indicator method or system. In an embodiment, a precision indicator can be provided in a bingeo database that includes bingeos and associated precision indicators.

In a sample embodiment wherein a bingeo is sixty-four bits, the sixty-four bits can be numbered one through sixty-four, with bit sixty-four being the left-most bit, or traditionally well-known in the art as the most-significant bit. In such an embodiment, the first hierarchy of segmentation can be assigned bingeo bits sixty-four and sixty-three, while the second segmentation level can be assigned bingeo bits sixty-two and sixty-one. This pattern can continue, whereupon the thirty-second iteration can be assigned bingeo bits two and one. Those with ordinary skill in the art will recognize that such ordering of bits and corresponding assignment is merely for illustration and not limitation. For example, another embodiment can otherwise combine bits from different iteration or segmentation levels before incorporating them into the bingeo. In yet another embodiment, the first hierarchy of iteration can correspond to the least significant bits in the bingeo. In an embodiment, the least significant bit can be known as bit zero, bit "A", or another identification scheme, etc.

In the embodiment presented in FIGS. 1–3, the binary digits incorporated into the bingeo are the binary digits that correspond to the binary representation assigned to a "selected" quadrant. For the illustrated system, the selected quadrant can be understood as the quadrant to be segmented on the next hierarchical level of segmentation or iteration. The selected quadrant can also be understood to be that quadrant including the location or geographic identity to be converted to a bingeo. For example, in the illustration of FIG. 2, the selected quadrant for the various iterations is the quadrant known as quadrant one and represented by the corresponding bit pair "01".

Returning again to FIG. 3, FIG. 3 illustrates the four bingeos 30 that exist upon the first segmentation according to a segmentation algorithm of FIG. 2, wherein the illustrated bingeos are presented in hexadecimal notation. In the illustrated systems, bingeos can be initialized as zero, however in an alternate embodiment according to the illustrated systems, the bingeos could also be initialized to hex value 0xFFFFFFFFFFFFFFFF. Accordingly, in the illustrated system, at segmentation "level 1", the bingeo bits are zero with the exception of bits sixty-four and sixty-three that correspond to the respective assigned quadrant bit pairs. Upon a second segmentation, to segmentation "level 2", four quadrants are formed from the selected quadrant one of segmentation "level 1". The bingeo hexadecimal notations can be illustrated by 32, wherein the "level 2" bingeos can be formed by placing the respective bit-pair assignments from the four quadrants in bits sixty-two and sixty-one; however, because this segmentation level is derived from a previous segmentation, the bingeo from the previous segmentation level is preserved (i.e., bits sixty-four and sixty-three). As FIG. 3, indicates, this process of incorporating the binary code or number from the selected segment, subdividing, and appending a new bit pair, continues through levels three, four, and five. With a different level of segmentation, the bingeo can be assigned more binary digits, and therefore can become more accurate.

Upon examination of FIG. 3, it can be recognized for the illustrated embodiment, that "quadrant zero" for a given segmentation level has the same representation of the previous level from which the bingeo is derived, as quadrant zero in this representative example provides a "00" to the bingeo. It can also be recognized, however, that although the bingeos of, for example, "level three, quadrant zero", and "level two, quadrant one", are equivalent, the "level three, quadrant zero" bingeo has a precision of six bits, while the "level two, quadrant one" bingeo has a precision of four bits.

Referring back to FIG. 2, the illustrated quadrant resolution increases geometrically with segmentation layer, such that succeeding bit pairs incorporated into the bingeo can increase the bingeo accuracy, and wherein for the illustrative segmentation scheme of FIG. 2, the segmentation resolution increases twenty-five percent as compared to the previous segmentation or hierarchical layer. For the illustrative system, bingeo bit pairs can therefore correspond to an iteration level and hence a segmentation size. For the example embodiment, bingeo bits one and two can relate to an accuracy or segmentation size of 0.16 square inches. Alternately, a similarly designed bingeo having inputs from only three segmentation or hierarchical layers provides an accuracy or segmentation size of 7,290,000 square miles.

Figure 4:
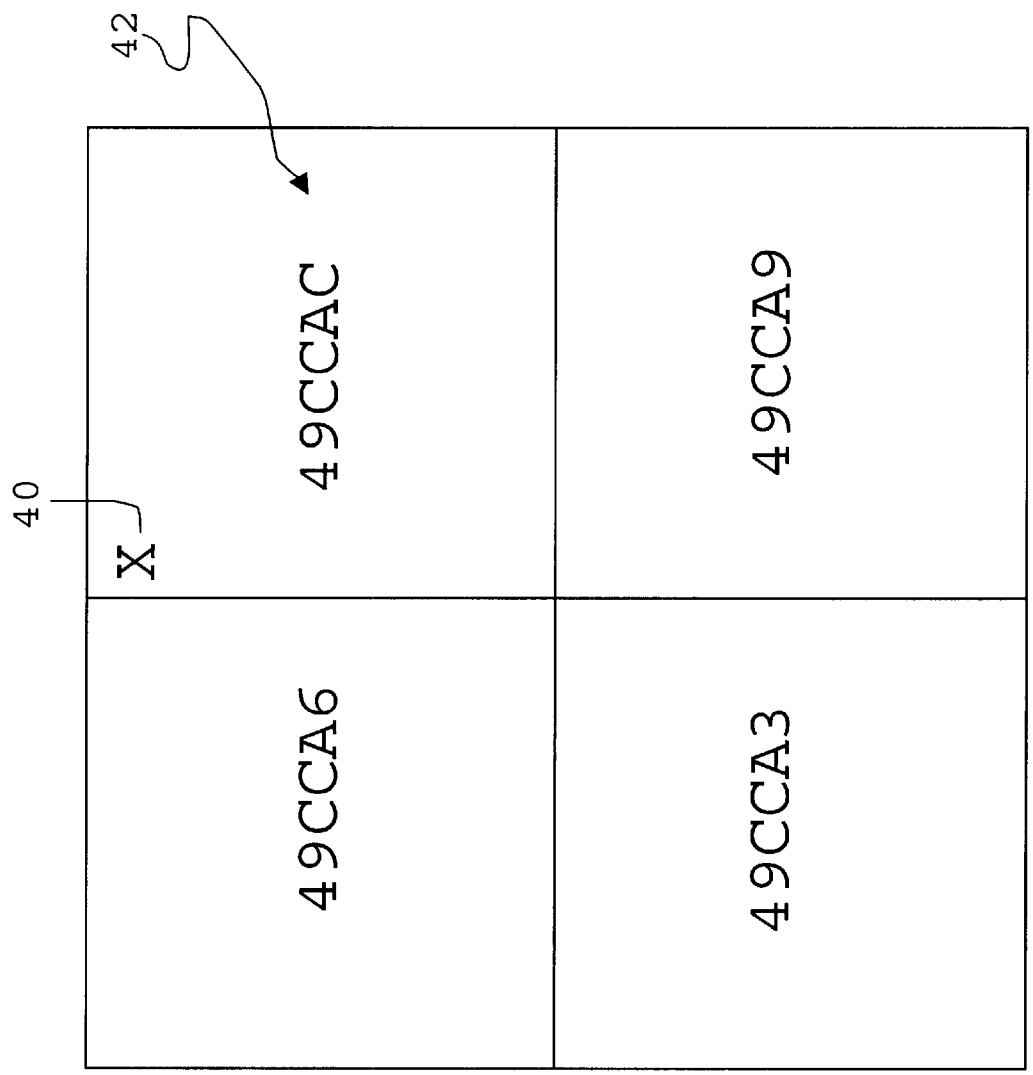
FIG. 4 illustrates the segmentation and bingeo construction from FIGS. 1–3 as applied to a specific location.

Referring now to FIG. 4, there is an illustration of the segmentation algorithm and bingeo generation for a specified location. The specified location for which a bingeo is desired is shown in FIG. 4 as "X" 40 for segmentation and bingeo generation algorithms according FIGS. 1–3, where several segmentation iterations have occurred to form the bingeos that are represented by the hexadecimal numbers in the quadrants. Trailing zeros are not presented in the FIG. 4 bingeos.

In an embodiment that can be represented by FIG. 4, wherein a bingeo is computed for a specified location, the "selected" quadrant at a given iteration is that quadrant wherein the specified location (i.e., "X") resides. For FIG. 4, the selected quadrant is quadrant two 42, wherein for the illustrated embodiment, quadrant two is assigned a binary representation of "10" at the iteration levels. This "10" binary value can be incorporated into the bingeo before the next algorithm iteration or segmentation.

FIG. 5 provides the results of the next segmentation level for the embodiment of FIG. 4, with corresponding bingeos updated from FIG. 4 to reflect the selection or segmentation of quadrant three (i.e., "11"). As shown by FIG. 5, the next layer of segmentation is performed on quadrant one 50, represented by "01" in the FIG. 4 and FIG. 5 embodiments, wherein quadrant one includes the specified location, "X" 40.

In the FIG. 4 and FIG. 5 example embodiment, the iterative segmentation and bingeo updating can continue in the manner demonstrated by FIGS. 4 and 5, until thirty-two segmentations and bingeo updates are performed. For the example embodiment, the corresponding result is a sixty-four bit bingeo that accurately represents the location of "X" 40 to 0.16 square inches, as discussed previously. Furthermore, the bingeo can be easily compared to other bingeos derived in the same manner. For example, in the representative system of FIGS. 1–5, where the latitude and longitude system is the reference or coordinate system, two bingeos can be efficiently compared, for example, by performing a logical, bitwise comparison, for example a logical XOR (exclusive OR), and determining those bits that are different. Because the bingeos of the illustrated system can be derived such that a bingeo bit position (i.e., bit pair) can relate to a segmentation level or precision that can be related to a distance measure, a system, computer, etc., can easily determine the location differences or distance measures between two bingeos by comparing the positions of the differing bits and relating such differing bit positions to segmentation levels, precisions, and/or distance measures. This comparison method can be extremely efficient when compared to the complex algorithms and computations that are required to convert, for example, two latitude/longitude pairs to other units to obtain a meaningful difference between the two latitudes and longitudes. Furthermore, a relative comparison of bingeos for different geographical locations can be performed to determine the proximity of the locations, without specifically knowing the identity of the locations.

As FIGS. 4 and 5 indicate, there can be scenarios wherein a selected location for which a bingeo is to be computed, can be very near a quadrant segmentation line. In such cases, herein referred to as "border cases", special processing can be performed to identify neighboring segments. For example, consider a scenario shown in FIG. 4, wherein a selected location can be within several feet of a segmentation divider at the very highest hierarchical level of segmentation. In an embodiment wherein the bingeo is sixty-four bits, bingeo bits sixty-four and sixty-three for the selected location can correspond to quadrant two (i.e, "10") in this example, while a bingeo for a geographically proximate location in quadrant zero for this example will have corresponding bits sixty-four and sixty-three of "00". Without border case processing, this bingeo difference at a high level of segmentation can indicate a potentially large geographical difference, when perhaps the geographical difference is not different, but based on a border issue.

In an embodiment, bingeo comparisons can be processed using a border case algorithm to identify border cases. In an embodiment according to the methods and systems of FIGS. 1–5 and wherein two bingeos referred to as reference bingeos can be compared, the border case algorithm can identify eight segments and corresponding eight bingeo representations for the two reference bingeos. The eight surrounding segments and their associated bingeos can be referred to herein as neighbor segments and neighbor bingeos. For the illustrated systems wherein eight neighbor bingeos can be identified and/or computed for a given reference bingeo, neighbor bingeos for the reference bingeos can be computed at various precision levels. By identifying and comparing neighbor bingeos at different precision levels, a proximity to segmentation border can be determined. Once border cases are identified and related to specified segmentation levels or precisions for the reference bingeos, relative geographic proximity of the reference bingeos can be more accurately computed.

Figure 6:
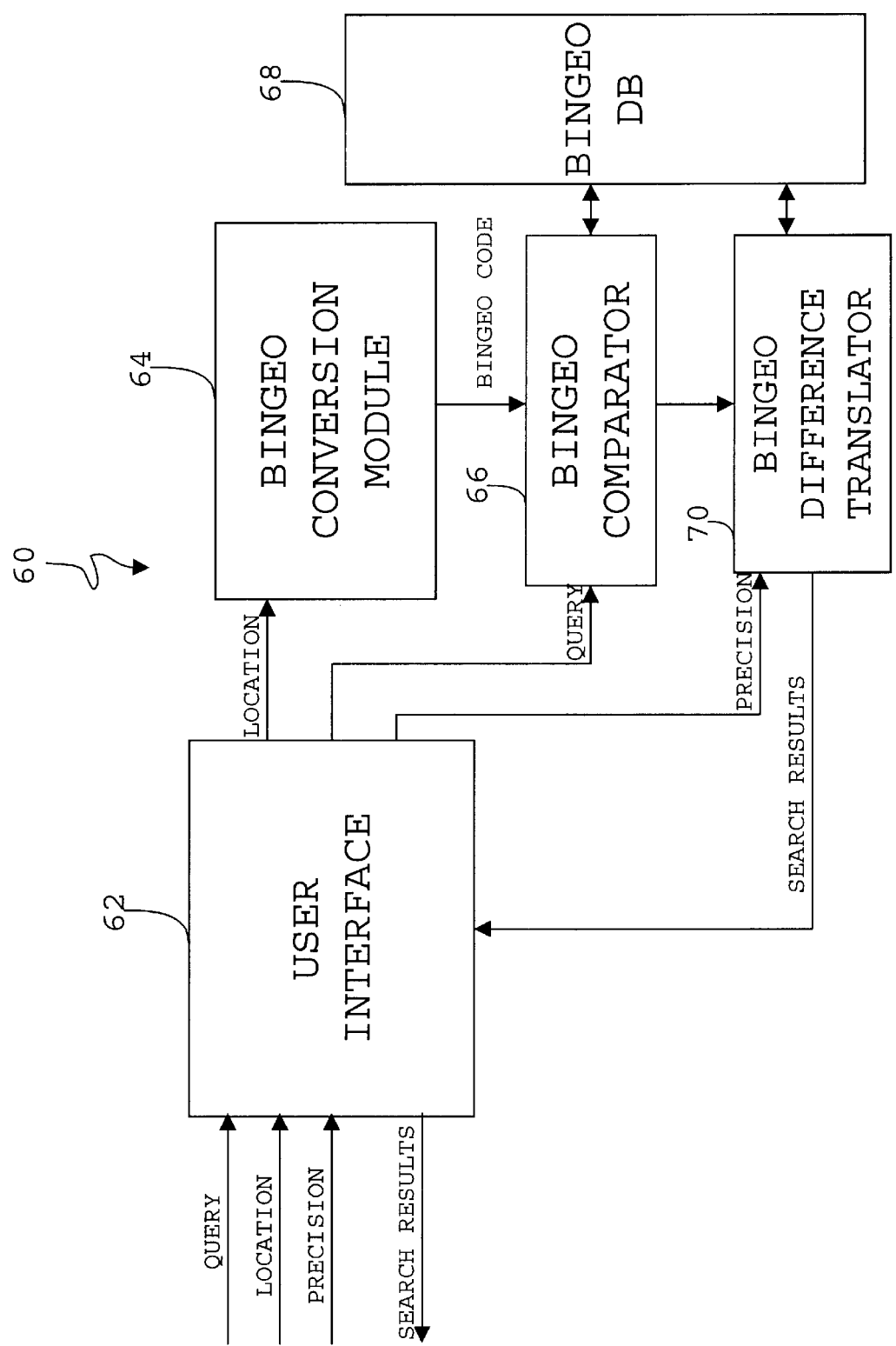
FIG. 6 illustrates a sample system architecture for practicing the methods and systems.

Referring now to FIG. 6, there is shown a system 60 wherein bingeos can be utilized for efficient and rapid comparison of locations, for example, to identify items, services, etc., within a specified distance of a given location. The system of FIG. 6 can be implemented using a digital computer system and information sources that are accessible via a communication network, keyboard, digital camera, microphone, etc. The digital computer system can be a microprocessor-based system including a computer workstation, such as a PC workstation or a SUN workstation, that includes a program for organizing and controlling the digital computer system to operate according to the methods and systems. Additionally and optionally, the microprocessor-based system can be equipped with a sound and video card for processing multimedia data. The computer system can operate as a stand-alone system or as part of a networked computer system. Alternatively, the computer system can be dedicated devices, such as embedded systems, that can be incorporated into existing hardware devices, such as telephone systems, PBX systems, sound cards, etc. Accordingly, it will be understood by one of ordinary skill in the art that the system described herein has wide applicability and can be incorporated in many systems, and realized in many forms.

The representative embodiment system 60 of FIG. 6 includes a user interface 62 that can accept a location, a query, and a precision. The location can be location information that can include a latitude and longitude, a street address, parcel, ward, a zip code or area code, a direction, etc., and in the illustrated example, can be the location of a person or entity submitting the query. The query can be for information such as restaurants in a specific area, service stations, dry cleaners, etc. A requesting entity therefore can supply geographic information that can be related to a bingeo, and similarly, the information requested can be an information, person, entity, etc., that can be associated with a geographic location that can be related to a bingeo. Alternately, a query can specify precision in miles or some other distance measure, and in the illustrated embodiment, the precision can be interpreted relative to the submitted location, although other embodiments can use other relative references for precision. The user interface 62 can accept the location, query, and precision information and send the location information to the bingeo conversion module 64.

The illustrated bingeo conversion module 64 can convert the location information to a specific coordinate system that can be, for example, the latitude and longitude reference system discussed herein. For example, when the illustrated bingeo conversion module 64 receives geographic information including a zip code or area code, the bingeo conversion module 64 can determine the centroid of the zip code or area code, and translate such information to a latitude and longitude.

Once the illustrated bingeo conversion module 64 has a latitude and longitude for the specified location, it can convert the latitude and longitude to a bingeo using a recursive, hierarchical, or iterative segmentation scheme or algorithm such as described herein. In a FIG. 6 system 60 utilizing the bingeo systems of FIGS. 1–5, a sixty-four bit bingeo can then transferred from the bingeo conversion module 64 to a bingeo comparator 66.

The illustrated bingeo comparator 66 can access a database 68 of bingeo codes, wherein the database bingeo codes can relate to services, items, people, etc., or an entity or individual having an association with geographic information. Access to the database 68 can be local or through a network, utilizing wired or wireless communications devices and protocols, etc. As indicated herein, geographic information can be understood to include information that can relate to a location or reference to a reference or coordinate system and using a reference system within the coordinate system, and can include but not be limited to area code and/or phone number, zip code, parcel, ward, address including street and/or state, latitude and/longitude, etc. In an embodiment, the bingeo database 68 can be organized by service, item, people, etc., and can be organized to list an item with its corresponding bingeo and/or precision. Alternately, the illustrated bingeo database 68 can represent multiple databases wherein a database can be categorized to bingeos for certain items, places, services, etc. The database 68, and other databases referred to herein, can be a memory having one or more physical or logical partitions and/or segments, and can optionally and additionally utilize one or more of well-known database packages including MySQL, SQL, Oracle, Informix, etc., with such examples provided merely for illustration and not limitation.

The illustrated comparator 66 can search the database 68 using, for example, the query item from the user interface to determine that part or parts of the bingeo database 68 that include relevant bingeos. Once the relevant bingeos are identified, the illustrated comparator 66 can perform a comparison between the location bingeo code and the relevant bingeos.

In one embodiment, the comparison can be performed using a logical, bitwise XOR (exclusive OR) operation between the location bingeo and the relevant database bingeo(s), although other comparison techniques can be used. Because in this example, the bit-pairs of the bingeo relate to a particular segment size, in certain embodiments, the result of the logical XOR can be converted to a distance measure by the bingeo difference translator 70 and compared to the precision provided by the user interface 62. Those comparisons indicating a difference satisfying the precision provided by the user interface, can be provided to the user interface 62 with the corresponding location (i.e., address) and identity of the entity/individual.

In an alternate embodiment, a precision from the user interface 62 can be provided to the bingeo conversion module 64, or perhaps another module not illustrated, and converted to a bingeo. Such conversion requires knowledge of the bingeo segmentation algorithm to determine the most accurate bingeo representation of the user-entered precision (i.e., relating the thirty-two bit pairs to the segmentation sizes). The bingeo precision could then be utilized by the comparator to further simplify the operations performed by the comparator, eliminating the conversion of bingeo differences (i.e., difference between the location bingeo and relevant database items) to a distance for comparison to the user-entered precision.

Those with skill in the art will readily recognize that the user interface 62 of FIG. 6 can be a computer display, cellular phone display, laptop or handheld computer display, etc. Similarly, the communications between a user and the user-interface 62, between the user-interface 62 and the bingeo conversion module 64, or between other modules illustrated in FIG. 6 or otherwise described herein, can be wired or wireless, RF, infrared, ultrasound, etc., using well-known communications techniques and/or protocols.

Those with ordinary skill in the art will recognize that the methods and systems of FIGS. 1–5 can also be implemented to provide a geocode, or more specifically, a binary geocode, as referenced in the co-pending application "Geographical Comparison Apparatus and Method," herein incorporated by reference. Accordingly, a bingeo is one form of a binary geocode. As indicated herein with respect to FIG. 6, and with regard to the incorporated reference, bingeos can be compared wherein a precision for one bingeo can be more precise than a precision for another bingeo. For example, if one party provides geographic information that includes less specific information such as a zip code or area code, the bingeo can only be computed to a certain degree of accuracy. In another embodiment using the example of a zip code, the bingeo could be computed to a precise degree of accuracy using the centroid of the zip code; however, an uncertainty can be associated with the bingeo in such an example as the location of the entity within the zip code relative to the centroid, may be unknown. This uncertainty can be included as a factor in some systems and methods.

One advantage of the methods and systems over the prior art is that the methods and systems form binary representations of locations that allow accurate and efficient comparison of locations by merely performing a single binary operation.

What has thus been described is a method and apparatus of converting geographic information to a binary representation, otherwise known as a bingeo. The geographic information can be converted to a binary representation within a selected reference or coordinate system, and with respect to a reference within the selected coordinate system. The conversion between the coordinate system location and the bingeo can occur by iteratively and logically segmenting the coordinate system, or segments thereof. The iterative algorithm can include identifying the segment that includes the specified location, and segmenting the identified segment. During an iteration, segments can be assigned a unique binary code that can be incorporated into the bingeo. In an embodiment, the bingeo can be sixty-four bits, while an algorithm iteration can produce a unique two-bit designation that can be assigned a unique location within the bingeo. In this embodiment, as many as thirty-two segmentation iterations can be performed, with the iterative segmentations providing increased precision. For a coordinate system including latitude/longitude, a precision of 0.16 inches squared can be attained. Two bingeos can then be compared, in the simplest form, using a bitwise logical XOR.

The techniques described herein are not limited to a particular hardware or software configuration, and may find applicability in many computing or processing environments. The techniques can be implemented in hardware or software, or a combination of hardware and software. The techniques can be implemented in one or more computer programs executing on one or more programmable computers that include a processor, a storage medium readable by the processor (including volatile and non-volatile memory and/or storage elements), one or more input devices, and one or more output devices.

The computer program(s) is preferably implemented in one or more high level procedural or object-oriented programming languages to communicate with a computer system; however, the program(s) can be implemented in assembly or machine language, if desired. The language can be compiled or interpreted. The computer program(s) can be preferably stored on a storage medium or device (e.g., CD-ROM, hard disk, or magnetic disk) readable by a general or special purpose programmable computer for configuring and operating the computer when the storage medium or device is read by the computer to perform the procedures described herein. The system can also be considered to be implemented as a computer-readable storage medium, configured with a computer program, where the storage medium so configured causes a computer to operate in a specific and predefined manner.

Although the methods and systems have been described relative to a specific embodiment thereof, they are not so limited. Obviously many modifications and variations may become apparent in light of the above teachings. For example, although the bingeo presented herein is thirty-two bits, other sized bingeos can be used. Other coordinate or reference systems can be used, and it is not necessary to divide the coordinate system or segments thereof into quadrants at an iteration. The segmentation scheme can be overlapping or non-overlapping. Alternate systems can divide the coordinate system into greater, or fewer, segments. Similarly, the assignment of quadrants and binary designations to quadrants can be altered. The translation of information from the various segmentation levels to the bingeo can be performed differently than presented herein, wherein the bits from the selected quadrant are merely assigned particular positions within the bingeo. The bingeos can be compared using a variety of different mechanisms and it is not required to use a logical XOR, or other processing beyond the logical XOR can also be performed. Certain modules related to FIG. 6 can be separated or combined.

Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

What is claimed is:

1. A method of forming a binary representation of geographic information based on a coordinate system, the method comprising, relating the geographic information to the coordinate system, providing a hierarchical segmentation scheme to create subdivisions based on the geographic information, assigning a binary code to the subdivisions, determining a level of the hierarchical scheme to provide a desired precision for the binary representation, forming the binary representation based on the assigned binary codes and the desired precision.

2. A method according to claim 1, wherein relating the geographic information includes determining a location in the coordinate system.

3. A method according to claim 1, wherein providing a hierarchical segmentation scheme includes providing an iterative scheme.

4. A method according to claim 1, wherein providing a hierarchical segmentation scheme includes providing a recursive scheme.

5. A method according to claim 1, wherein providing a hierarchical segmentation scheme includes providing a scheme to create subdivisions from at least one of the coordinate system or a subdivision of the coordinate system.

6. A method according to claim 1, wherein providing a hierarchical segmentation scheme includes providing a scheme to create four segments from at least one of the coordinate system or a subdivision of the coordinate system.

7. A method according to claim 1, wherein assigning a binary code includes assigning a two bit binary code.

8. A method according to claim 1, wherein forming the binary representation includes associating bits of the binary representation with a level of the hierarchical scheme.

9. A method according to claim 1, further including initializing the binary representation to be zero.

10. A method according to claim 1, further including initializing the binary representation to includes ones in every location.

11. A method according to claim 1, further including at least one of storing the binary representation in a database and storing a precision indicator based on the binary representation precision.

12. A method according to claim 1, further including selecting a reference relative to the coordinate system.

13. A method according to claim 1, wherein relating the geographic information to the coordinate system includes computing a centroid based on the geographic information.

14. A method according to claim 1, wherein relating the geographic information includes relating at least one of latitude, longitude, direction, parcel, ward, street address, city, town, zip code, telephone number, area code, destination, and direction.

15. A method of forming a binary representation of geographic information based on a coordinate system, the method comprising, relating the geographic information to the coordinate system, iteratively creating subdivisions from at least one of the coordinate system or a subdivision of the coordinate system, assigning a binary code to the created subdivisions, and, forming the binary representation based on the binary code of the identified created subdivision.

16. A method according to claim 15, wherein iteratively creating includes iteratively creating from a subdivision of the coordinate system that is related to a location of the geographical information in the coordinate system.

17. A method according to claim 15, wherein iteratively creating subdivisions further includes dividing into quadrants.

18. A method according to claim 15, further including determining a scheme for assigning the binary codes at the iteration levels.

19. A method according to claim 15, wherein assigning a unique binary code includes assigning a unique two bit binary code.

20. A method according to claim 15, wherein forming the binary representation includes associating an iteration level with positions in the binary representation.

21. A method according to claim 15, further comprising ending the iteration based on a level of precision.

22. A method according to claim 15, further comprising ending the iteration based on a size of the binary representation.

23. A method according to claim 15, wherein relating the geographic information to a location includes computing a latitude and longitude based on the geographic information.

24. A method according to claim 15, wherein relating the geographic information to the coordinate system includes computing a centroid based on the geographic information.

25. A method according to claim 15, wherein iteratively creating subdivisions includes creating subdivisions of equal size.

26. A method according to claim 15, further comprising initializing the binary representation to zero.

27. A method according to claim 15, further comprising initializing the binary representation to include ones in every location.

28. A method according to claim 15, further including specifying a size for the binary representation.

29. A method according to claim 15, further including specifying a size of sixty-four bits for the binary representation.

30. A method according to claim 15, further including selecting a reference frame within the coordinate system.

31. A method according to claim 15, further including providing a scheme to assign a binary code.

32. A method according to claim 15, further including receiving the geographic information as one of latitude, longitude, direction, parcel, ward, street address, town, city, zip code, telephone number, area code, destination, and direction.

33. A method for comparing a first location and a second location, comprising, using an iterative process to obtain a binary representation of the first location, using the iterative process to obtain a binary representation of the second location, performing a binary computation utilizing the first location binary representation and the second location binary representation to obtain a binary result, and computing a distance measure from the binary result.

34. A method according to claim 33, wherein using an iterative process includes, relating the location to a coordinate system, and, iteratively creating subdivisions from at least one of the coordinate system or a subdivision of the coordinate system, assigning a binary code to the created subdivisions, and, forming the binary representation based on the binary code of the identified created subdivision.

35. A method according to claim 33, wherein performing a binary computation includes performing an exclusive OR (XOR).

36. A method according to claim 33, wherein computing a distance measure further includes associating binary digits of the binary result to at least one distance measure.

37. A method according to claim 33, further including identifying at least one binary representation corresponding to at least one neighbor of the first location.

38. A method according to claim 33, further including identifying at least one binary representation corresponding to at least one neighbor of the second location.

39. A method according to claim 33, further including computing at least one binary representation corresponding to at least one neighbor of the first location.

40. A method according to claim 33, further including computing at least one binary representation corresponding to at least one neighbor of the second location.

41. A method according to claim 33, further including determining at least one of whether the binary representation of the first location is a neighbor of the binary representation of the second location, and whether the binary representation of the second location is a neighbor of the binary representation of the first location.

42. A system for comparing at least two locations, comprising, an interface to receive geographical information based on at least one of the at least two locations, a processor having instructions to convert the geographical information to a binary representation using a hierarchical segmentation scheme, where levels of the hierarchical scheme are associated with a precision for the binary representation, a database that includes binary representations of at least another of the at least two locations, a comparator to perform a binary computation between binary representations.

43. A system according to claim 42, further including a difference translator to determine difference measure from the comparator result.

44. A system according to claim 42, further comprising a neighbor location module to identify the binary representations of neighbors for the at least two locations.

45. A system according to claim 42, wherein the comparator is an exclusive OR.

46. A system according to claim 42, wherein the processor has instructions for, relating the geographical information to a coordinate system, iteratively creating subdivisions from at least one of the coordinate system or a subdivision of the coordinate system, assigning a binary code to the created subdivisions, and,
forming the binary representation based on the binary code of the identified created subdivision.

47. A system according to claim 42, further including precision indicators associated with the binary representations in the database.

48. A system according to claim 42, further including a precision indicator associated with the binary representation.

49. A system according to claim 42, further including identity information associated with the binary representations in the database.

50. A system for forming a binary representation of geographic information based on a coordinate system, the system comprising,
means for providing the geographic information,
means for implementing a hierarchical segmentation scheme to create subdivisions based on the geographic information,
means for determining a level of the hierarchial scheme to provide a desired precision for the binary representation
means for assigning a binary code to the subdivisions, and,
means for forming the binary representation based on the assigned binary codes and the desired precision.

51. A system according to claim 50, wherein the means for providing include any internet-accessible device.

52. A system according to claim 50, wherein means for implementing a hierarchical segmentation scheme include a processor and processor instructions.

53. A computer product for brining a binary representation of geographic information based on a coordinate system, the computer product disposed on a computer readable medium and having instructions for causing a processor to,
relate the geographic information to the coordinate system,
provide a hierarchical segmentation scheme to create subdivisions based on the geographic information,
determine a level of the hierarchical scheme to provide a desired precision,
assign a binary code to the subdivisions, and,
form the binary representation based on the assigned binary codes and the desired precision.

54. A computer product according to claim 53, wherein instructions to relate the geographic information include instructions to determine a location in the coordinate system.

55. A computer product according to claim 53, wherein instructions to provide a hierarchical segmentation scheme include instructions to provide an iterative scheme.

56. A computer product according to claim 53, wherein instructions to provide a hierarchical segmentation scheme include instructions to provide a recursive scheme.

57. A computer product according to claim 53, wherein instructions to provide a hierarchical segmentation scheme include instructions to provide a scheme to create subdivisions from at least one of the coordinate system or a subdivision of the coordinate system.

58. A computer product according to claim 53, wherein instructions to provide a hierarchical segmentation scheme include instructions to provide a scheme to create four segments from at least one of the coordinate system or a subdivision of the coordinate system.

59. A computer product according to claim 53, wherein instructions to assign a binary code includes assigning a two bit binary code.

60. A computer product according to claim 53, wherein instructions to form the binary representation include instructions to associate bits of the binary representation with a level of the hierarchical scheme.

61. A computer product according to claim 53, further including instructions to initialize the binary representation to be zero.

62. A computer product according to claim 53, further including instructions to initialize the binary representation to includes ones in every location.

63. A computer product according to claim 53, further including instructions to at least one of store the binary representation in a database and store a precision indicator based on the binary representation precision.

64. A computer product according to claim 53, further including instructions to select a reference relative to the coordinate system.

65. A computer product according to claim 53, wherein instructions to relate the geographic information to the coordinate system include instructions to compute a centroid based on the geographic information.

66. A computer product according to claim 53, wherein instructions to relate the geographic information include instructions to relate at least one of latitude, longitude, direction, parcel, ward, street address, city, town, zip code, telephone number, area code, destination, and direction.

67. A computer product for forming a binary representation of geographic information based on a coordinate system, the computer product disposed on a computer readable medium and having instructions for causing a processor to,
relate the geographic information to the coordinate system,
iteratively create subdivisions from at least one of the coordinate system or a subdivision of the coordinate system,
assign a binary code to the created subdivisions, and,
form the binary representation based on the binary code of the identified created subdivision.

68. A computer product according to claim 67, wherein instructions to iteratively create include instructions to iteratively create from a subdivision of the coordinate system that is related to a location of the geographical information in the coordinate system.

69. A computer product according to claim 67, wherein instructions to iteratively create subdivisions further include instructions to divide into quadrants.

70. A computer product according to claim 67, further including instructions to determine a scheme for assigning the binary codes at the iteration levels.

71. A computer product according to claim 67, wherein instructions to assign a unique binary code include instructions to assign a unique two bit binary code.

72. A computer product according to claim 67, wherein instructions to form the binary representation include instructions to associate an iteration level with positions in the binary representation.

73. A computer product according to claim 67, further comprising instructions to end the iteration based on a level of precision.

74. A computer product according to claim 67, further comprising instructions to end the iteration based on a size of the binary representation.

75. A computer product according to claim 67, wherein instructions to relate the geographic information to a location include instructions to compute a latitude and longitude based on the geographic information.

76. A computer product according to claim 67, wherein instructions to relate the geographic information to the coordinate system include instructions to compute a centroid based on the geographic information.

77. A computer product according to claim 67, wherein instructions to iteratively create subdivisions include instructions to create subdivisions of equal size.

78. A computer product according to claim 67, further comprising instructions to initialize the binary representation to zero.

79. A computer product according to claim 67, further comprising instructions to initialize the binary representation to include ones in every location.

80. A computer product according to claim 67, further including instructions to specify a size for the binary representation.

81. A computer product according to claim 67, further including instructions to specify a size of sixty-four bits for the binary representation.

82. A computer product according to claim 67, further including instructions to select a reference frame within the coordinate system.

83. A computer product according to claim 67, further including instructions to provide a scheme to assign a binary code.

84. A computer product according to claim 67, further including instructions to receive the geographic information as one of latitude, longitude, direction, parcel, ward, street address, town, city, zip code, telephone number, area code, destination, and direction.

85. A computer product for comparing a first location and a second location, the computer product disposed on a computer readable medium and having instructions for causing a processor to, use an iterative process to obtain a binary representation of the first location, use the iterative process to obtain a binary representation of the second location, perform a binary computation utilizing the first location binary representation and the second location binary representation to obtain a binary result, and compute a distance measure from the binary result.

86. A computer product according to claim 85, wherein instructions to use an iterative process include instructions to, relate the location to a coordinate system, and, iteratively create subdivisions from at least one of the coordinate system or a subdivision of the coordinate system, assign a binary code to the created subdivisions, and, form the binary representation based on the binary code of the identified created subdivision.

87. A computer product according to claim 85, wherein instructions to perform a binary computation include instructions to perform an exclusive OR (XOR).

88. A computer product according to claim 85, wherein instructions to compute a distance measure further include instructions to associate binary digits of the binary result to at least one distance measure.

89. A computer product according to claim 85, further including instructions to identify at least one binary representation corresponding to at least one neighbor of the first location.

90. A computer product according to claim 85, further including instructions to identify at least one binary representation corresponding to at least one neighbor of the second location.

91. A computer product according to claim 85, further including instructions to compute at least one binary representation corresponding to at least one neighbor of the first location.

92. A computer product according to claim 85, further including instructions to compute at least one binary representation corresponding to at least one neighbor of the second location.

93. A computer product according to claim 85, further including instructions to determine at least one of whether the binary representation of the first location is a neighbor of the binary representation of the second location, and whether the binary representation of the second location is a neighbor of the binary representation of the first location.

* * * * *